United States Patent [19]

Austin

[11] 4,371,629
[45] Feb. 1, 1983

[54] PREPARATION OF A SEMIFLEXIBLE ENERGY MANAGEMENT POLYETHER POLYURETHANE FOAM USING AS A CROSSLINKER-SURFACTANT AN ETHYLENE OXIDE ADDUCT OF A MANNICH CONDENSATE PREPARED FROM THE REACTION OF NONYL PHENOL, DIETHANOLAMINE AND FORMALDEHYDE

[75] Inventor: Thomas H. Austin, Austin, Tex.

[73] Assignee: Texaco Inc., White Plains, N.Y.

[21] Appl. No.: 303,259

[22] Filed: Sep. 17, 1981

Related U.S. Application Data

[63] Continuation-in-part of Ser. No. 191,976, Sep. 29, 1980, abandoned.

[51] Int. Cl.$^3$ ............................................. C08G 18/14
[52] U.S. Cl. ................................. 521/115; 521/129; 521/164
[58] Field of Search ....................... 521/115, 129, 164

[56] References Cited

U.S. PATENT DOCUMENTS

| | | | |
|---|---|---|---|
| 2,998,452 | 8/1961 | Bruson et al. | 252/548 |
| 4,137,265 | 1/1979 | Edwards et al. | 521/167 |

OTHER PUBLICATIONS

Saunders et al., Polyurethanes, Part II, Interscience, NY, 1964, pp. 5 & 199.

*Primary Examiner*—Maurice J. Welsh
*Attorney, Agent, or Firm*—Jack H. Park; Kenneth R. Priem; David L. Mossman

[57] ABSTRACT

The incorporation of a crosslinker comprising an ethylene oxide adduct of a Mannich condensate of nonyl phenol, diethanolamine and formaldehyde in molded polyurethane semiflexible foams is disclosed. Semiflexible polyurethane foams incorporating this crosslinker result in foams which offer many advantages including a significant improvement in moldability characteristics and materials utilization as well as other advantages. These improvements are demonstrable over similar formulations using other crosslinkers. The resulting foams find use in energy absorbing applications in the automotive industry and other industries.

15 Claims, No Drawings

PREPARATION OF A SEMIFLEXIBLE ENERGY MANAGEMENT POLYETHER POLYURETHANE FOAM USING AS A CROSSLINKER-SURFACTANT AN ETHYLENE OXIDE ADDUCT OF A MANNICH CONDENSATE PREPARED FROM THE REACTION OF NONYL PHENOL, DIETHANOLAMINE AND FORMALDEHYDE

This is a continuation-in-part of application Ser. No. 191,976 filed Sept. 29, 1980, now abandoned.

BACKGROUND OF THE INVENTION

1. Field of the Invention

This invention relates to the production of molded polyurethane products.

2. Description of the Prior Art

The particular crosslinker which is found to be advantageous for use in semiflexible energy absorbing foams of this invention has been described as a detergent in U.S. Pat. No. 2,998,452.

U.S. Pat. No. 4,137,265 discloses the Mannich condensate precursor of the crosslinker of the present invention. This patent describes and claims a polyol which is a propylene oxide adduct of the Mannich condensate precursor for use in forming rigid polyurethane foams. U.S. Pat. No. 4,137,265 discloses and claims the propylene oxide adduct of nonyl phenol, formaldehyde and diethanolamine. This product is useful as the polyol for rigid foams. It was surprisingly discovered that the ethylene oxide adduct of the Mannich condensate found particular advantage in formulations for semiflexible foams.

The automotive industry, in particular, is constantly seeking new technologies for increasing the safety of vehicles, while, at the same time, decreasing the weight of the vehicles. A major part of the safety program in the automotive industry is the use of molded polyurethane foams which absorb energy upon impact. The present invention presents an improved method of preparing molded polyurethane foam which in addition to absorbing impact, are lighter in weight resulting in less vehicle weight.

SUMMARY OF THE INVENTION

The invention is a method for preparing a molded flexible polyurethane product wherein a polyol, a polyisocyanate, water and a crosslinker comprising an ethylene oxide adduct of a Mannich condensate prepared from nonyl phenol, diethanolamine and formaldehyde are reacted in a closable mold. The invention is also a molded flexible polyurethane product prepared by the above method.

DESCRIPTION OF THE PREFERRED EMBODIMENTS

In the molding of polyurethane products, the reaction mixture is charged to a rigid mold which is sufficiently strong that it will not deform when subjected to the pressure within the mold after the foaming reaction starts. Such a mold can be constructed out of metal, plastic, wood or other materials and combinations of materials. In the practice of my invention, the mold should be sufficiently strong to withstand the molding pressures and also be capable of sealing to the extent that the reaction mixture is not pushed from the mold during the foaming process.

To this preheated mold is charged a sufficient quantity of the foamable polyurethane reaction mixture of my invention to overfill the mold by about 10% to about 20%. The term "overfill the mold" means that quantity of the foamable reaction mixture which is greater than the quantity necessary to just fill the mold after the reaction is complete. I use about 10% to about 20% overfill in the practice of my invention. A greater overfill is possible with very strong and tightly closed molds and would tend to increase the density of the foam.

This overfill and tightly closed mold in conjunction with the reaction mixture of my invention all combine to pack the polyurethane foam material and give an improved cell structure substantially free of voids and also an improved skin quality of the resulting product. After the material has foamed, it is allowed to stand in the mold for about three to nine minutes usually without any further external heat being necessary to cure the product. Of course, the foam product can be cured longer but longer curing is usually unnessary. The product is removed from the mold after this short cure time and a flexible polyurethane product is recovered which has a substantially open cell structure, a good skin and is substantially free of any voids.

In order to successfully practice my invention, it is necessary to use the formulations which I have discovered.

In the one shot process of my invention, the polyether polyol component, the organic polyisocyanate, water, crosslinker and catalyst are all brought together simultaneously and allowed to react, foam and cure in the mold without any additional high temperature curing step.

The polyether polyol component (not the crosslinker) useful for the practice of this invention may be a polyol having a functionality of from two to about six and an equivalent weight of 1600 to about 2000 having about 80 to about 100% primary hydroxyl groups.

The polyether polyols useful in the practice of my invention are prepared by a well known process which involves the reaction of the polyhydric initiator such as ethylene glycol, propylene glycol, low molecular weight polypropylene glycol, trimethylolpropane, glycerol, 1,2,6-hexane triol, sorbitol, pentaerythritol, and the like, or mixtures thereof, with a lower alkylene oxide such as propylene oxide and butylene oxide, mixtures thereof, or mixtures of ethylene oxide with propylene oxide and/or butylene oxide. This reaction is carried out in a well known manner with an alkoxylation catalyst, generally an alkali metal hydroxide such as potassium hydroxide. The reaction is continued until the product of an approximate desired molecular weight is obtained. It is necessary to then react the product made as described above with ethylene oxide in order to acquire the desired degree of primary hydroxyl group termination of the polyether chains. This process is described in U.S. Pat. No. 3,336,242 for example. The percentage of primary hydroxyl groups terminating the polyether chain is generally increased by an addition of ethylene oxide alone; however, it will be understood that ethylene oxide mixed with some proportions of propylene oxide will also achieve this result. Also, it is within the scope of my invention to use a polyether polyol which may have blocked segments of different alkylene oxides in the molecule and not solely limiting such segments of ethylene oxide to the terminal positions.

While higher functionality polyether polyols may be used, it is preferred to use polyols having molecular weights of 3500 to about 4400 and about 80% or more primary hydroxyl groups which are alkylene oxide adducts of a mixture of a glycol and a triol, for example.

It is especially preferred to use a polyol of about 3900 to 4000 molecular weight which is an ethylene oxide capped propylene oxide adduct of a mixture of a polypropylene glycol of about 400 molecular weight and a propylene oxide adduct of glycerol having a molecular weight of about 700. The percentage of primary hydroxyl groups terminating this polyol is above about 80%.

The organic polyisocyanate is suitably an organic aromatic or aliphatic polyisocyanate such as 3,3'-dichloro-4,4,'-biphenyl diisocyanate, diphenyl diisocyanate, ethylene diisocyanate, propylene-1,2-diisocyanate, 1,4-tetramethylene diisocyanate, p-phenylene diisocyanate, 2,4- and 2,6-toluene diisocyanates, o,o'-, o,p'- and p,p'-diphenylmethane diisocyanates, hexamethylene diisocyanate, polymethylene polyphenylisocyanate, and mixtures thereof.

Especially preferred organic polyisocyanates useful in the practice of my invention are those prepared by the phosgenation of the reaction product between aniline and formaldehyde having a functionality of 2.2 or greater. While functionalities around four and above are possible, they are not readily attainable by known processes. It is preferred to use isocyanates having functionalities of about 2.2 to about 3.5 and an especially preferred range is between 2.2 and 2.8. Useful isocyanates are produced by phosgenating amine precursors formed in the process described in U.S. Pat. Nos. 2,683,730 and 3,362,979, for example.

The foams of this invention also contain a crosslinker which is the ethylene oxide adduct of the Mannich condensate of nonyl phenol, diethanolamine and formaldehyde. Preparation of this Mannich condensate may be found in U.S. Pat. No. 4,137,265, which is incorporated herein by reference. To this Mannich condensate is added ethylene oxide in an amount to give adducts with hydroxyl number values of 230 to 500 (as meq KOH/g sample). The preferred amount of ethylene oxide yielded an adduct with hydroxyl number value of 470–480 (as meq KOH/g sample).

The polyol component and the organic isocyanate component are mixed in the reaction mixture in such proportions that the ratio of isocyanato groups to hydroxyl groups, commonly known as isocyanate index, is from 0.85 to about 1.05 with an especially preferred isocyanate index being about 0.95. The ratio of isocyanato groups to hydroxyl groups includes also any water that is present in the foamable reaction mixture as well as the hydroxyl groups in the crosslinker of the invention.

Water is used to produce the blowing agent and/or adjust the density of the foam in the practice of this invention. It is an advantage to use the crosslinker of my invention so that a higher amount of water may be used and still obtain acceptable foam. It is preferred to use about 2.5 parts by weight of water per 100 parts of polyol component and it has been found that best results are obtained when the water range is from about 2.2 to about 4.5 parts by weight per 100 parts of polyol component.

The catalysts useful in my invention includes those normally employed in polyurethane foams including tertiary amines and organometallic compounds. It is within the skill of the ordinary worker in the art to choose a workable catalyst system.

For example, a partial list of useful tertiary amines include trialkylamines (e.g. trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., aliphatic polyamines, such as N,N,N'N'-tetramethyl-1,3-butanediamine. Also useful are those catalysts used in the examples which follow. Although the improvement is noted with a variety of catalysts, especially preferred is the two mole propylene oxide adduct of dimethylaminopropylamine; that is, the reaction product of dimethylaminopropylamine and two moles of propylene oxide.

A partial list of organic tin compounds used as catalysts which are particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

The catalysts useful in the preparation of polyether polyurethane foams described herein based on the combined weight of the hydroxyl-containing compound and polyisocyanate, are employed in an amount of from about 0.05 to about 2.0 weight percent. Preferably, the amount of catalyst used is 0.1–1.5 weight percent.

The catalysts used in this invention may be used ether alone or in a mixture with one or more other catalysts such as other tertiary amines or with an organic tin compound or other polyurethane catalysts.

Conventional formulation ingredients may also be employed as needed, such as, for example, foam stabilizers also known as silicone oils or emulsifiers. The foam stabilizer may be an organic silane or siloxane. For example, compounds may be used having the formula:

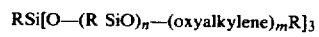

RSi[O—(R SiO)$_n$—(oxyalkylene)$_m$R]$_3$ wherein R is an alkyl group containing from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc., may be used. The inert blowing agent reduces the amount of excess isocyanate and water that is required in preparing flexible urethane foam. Selection of the proper blowing agent is well within the knowledge of those skilled in the art. See for example U.S. Pat. No. 3,072,582.

As the examples which follow demonstrate, it is advantageous to use the present crosslinker which is essentially a pentol in conjunction with other low molecular weight materials containing hydroxyl groups having hydroxyl numbers ranging from about 200 to 2000. For example, low molecular weight diols such as ethylene glycol, propylene glycol and dipropylene glycol have been found to be useful as well as carbamate diols and difunctional amine polyols as used in Examples XI–XV which follow. Other similar materials are also useful in conjunction with the crosslinker of the invention.

In the examples which follow, the invention will be demonstrated and many of the improvements will be apparent from the use of the crosslinker of the invention. However, many of the improvements are of a more subjective nature which are not demonstrable by objective test which are recognized in the art. I have noticed many improvements and advantages to the use of this crosslinker in semiflexible formulations including:

(1) significant improvement in moldability characteristics, (2) improved material utilization (lower density foam), (3) reduced number of voids in the molded parts, (4) superior processing with lessened sensitivity to machine conditions, (5) excellent cell structure and uniform appearance, (6) superior adhesion to vinyl skins used for molded parts, (7) significantly improved water utilization latitude, (8) improved cure characteristics (shorter demold time), (9) lower closed cell content which results in foam which does not shrink,

(10) excellent compatibility of the entire formulation which promotes uniform processing.

EXAMPLE I

Preparation of Crosslinker

A Mannich condensate was prepared from 1.0 moles nonylphenol, 2.0 moles of diethanolamine, and 2.0 moles of formaldehyde, and water was removed by vacuum stripping. (See U.S. Pat. No. 4,317,265).

To 61.8 lbs. of the stripped Mannich condensate, charged to a 15 gallon kettle and heated to 115° C., was added 25.5 pounds of ethylene oxide at 115–125° C., over a period of one hour and twenty minutes. The reaction mixture was digested at 110° C. for an additional one hour and ten minutes. Unreacted oxide was removed by vacuum stripping and the product was discharged after cooling. The product viscosity was 21,000 cps, water content was 0.05%, hydroxyl number was 475. This product will be referred to as Crosslinker A and is the crosslinker of the invention.

EXAMPLES II–V

These examples demonstrate use of the crosslinker as the sole crosslinker in formulations designed for semiflexible instrument panel foam. These cup pours were the initial pours made to determine the nature and foaming behavior of this material. In these and following examples, the components were weighed into a 5 in. (tall) paper cup, blended with stirring; MONDUR® MR was added, the mixture stirred thoroughly and 100–110 g of the mixture was poured into a second 5 in. cup and allowed to foam and rise. Rise time=time in seconds for foam to rise to top of cup. Tack Free=time in seconds for foam surface to freely release when probed with an object such as a tongue depressor or pencil.

| Formulation, pbw | II | III | IV | V |
|---|---|---|---|---|
| THANOL® SF-3950[1] | 100.0 | 100.0 | 100.0 | 100.0 |
| Crosslinker A | 10.0 | 8.0 | 8.0 | 5.0 |
| Water | 2.2 | 2.5 | 2.5 | 2.5 |
| THANCAT® DME[2] | — | 1.0 | — | — |
| THANCAT® DPA[3] | — | — | 1.5 | 1.2 |
| Carbon Black Paste | 2.0 | 2.0 | 2.0 | 2.0 |
| A-Component | | | | |
| MONDUR MR[4] | 47.0 | 49.0 | 49.0 | 45.5 |
| Cup Data | | | | |
| Rise Time, Sec. | 260 | 48 | 50 | 75[6] |
| Tack Free, Sec. | 420 | 150 | 120 | 225 |
| Cup Height, inches[5] | — | 6.8 | 6.7 | 6.9 |
| Cup Weight, grams | — | 75.8 | 76.6 | 71.3 |

[1] Ethylene oxide capped, propylene oxide adduct of mixed diol and trihydric initiators of about 3950 molecular weight, Product of TEXACO CHEMICAL CO.
[2] N,N—Dimethylethanolamine, Product of TEXACO CHEMICAL CO.
[3] Two mole propylene oxide adduct of dimethylaminopropylamine.
[4] Polymethylene polyphenylisocyanate, Product of Mobay Chem. Corp.
[5] Cup Height = Total height of risen foam at final rise height, Cup Weight = Weight of foam in cup after top of foam is cut off even with top rim of cup. This value provides free rise density and the cup height and weight are indicative of the potential foam usage when the foam compound is molded. In later examples, the mixed foam components are poured (Fill Weight, g) into a mold which contains parallel channels and the rising foam is forced to flow around successive 180° turns as it progresses through the channels. That which flows beyond the last channel is trimmed off (part weight, g). This method provides data regarding moldability, foam utilization, foam pressure, potential shrinkage problems (closed cell foam), and potential gassing problems.
[6] Foams in Examples II–V exhibited fine uniform cell structure, excellent reaction profile. A typical formulation used commercially (see Example X) exhibits rise and tack free times of 80, 330, respectively.

EXAMPLES VI–X

The examples demonstrate use of the crosslinker of the invention as an additive for semiflexible foam to promote better cell structure and function as a surfactant and cell control agent.

| Formulation, pbw | VI | VII | VIII | IX | X |
|---|---|---|---|---|---|
| B-Component | | | | | |
| THANOL SF-3950 Polyester Polyol | 97.5 | 97.5 | 97.5 | 100.0 | 97.5 |
| L-1217[1] | 2.5 | 2.5 | 2.5 | — | 2.5 |
| NIAX® 50-970[2] | 5.8 | 5.0 | 5.0 | — | 6.0 |
| Crosslinker A | 0.2 | 0.5 | 1.0 | 6.0 | — |
| Water | 2.2 | 2.2 | 2.2 | 2.5 | 2.2 |
| THANCAT® DD[3] | 0.35 | 0.35 | 0.35 | 0.30 | 0.35 |
| THANCAT® DMDEE[4] | 0.35 | 0.35 | 0.35 | 0.30 | 0.35 |
| Carbon Black Paste | 2.0 | 2.0 | 2.0 | 2.0 | 2.0 |
| A-Component | | | | | |
| MONDUR MR | 51.3 | 50.4 | 50.4 | 46.5 | 45.5 |
| Cup Data | | | | | |
| Rise Time, Sec. | 74 | | 76 | | 80 |
| Tack Free, Sec. | 330 | | 330 | | 330 |
| Cup Height, inches | 7.3 | | 7.3 | | 7.3 |
| Cup Weight, grams | 69.3 | | 69.8 | | 73.0 |
| Molding Data | | | | | |
| Fill Weight, grams | 310 | 305 | 305 | 302 | 310 |
| Part Weight, grams | 301 | 288 | 302 | 275[5] | 306 |

[1] Product of WITCO CHEMICAL CO.
[2] Product of UNION CARBIDE CO., a crosslinker.
[3] 2-Dimethylaminoethyl-3-dimethylaminopropyl ether, Product of TEXACO CHEMICAL CO.
[4] B,B-Dimorpholinodiethyl Ether, Product of TEXACO CHEMICAL CO.
[5] Note superior usage (less weight of foam to fill the mold) when Crosslinker A is substituted directly in a typical commercial formulation (Example X). This superior usage results from utilization of higher water levels which is possible with the use of this crosslinker. Also in these examples, when Crosslinker A is used, improved cell structure resulted.

EXAMPLES XI–XV

The examples demonstrate use of diluent crosslinkers. These crosslinkers are much lower in functionality than our Crosslinker A and are substituted into the formulation for part of the Crosslinker A to decrease the overall crosslink density and at the same time maintain the required load bearing properties. Improved usage results while inclusion of the Crosslinker A provides the improvements in cell structure, moldability and other factors mentioned earlier.

| Formulation, pbw | XI | XII | XIII | XIV | XV |
|---|---|---|---|---|---|
| B-Component | | | | | |
| THANOL SF-3950 | 100.0 | 100.0 | 100.0 | 100.0 | 100.0 |
| Crosslinker A | 6.0 | 6.0 | 6.0 | 6.0 | 6.0 |
| THANOL® C150[1] | 2.0 | — | — | — | — |
| THANOL® C165[1] | — | 2.0 | — | — | — |
| THANOL® C200[1] | — | — | 2.0 | — | — |
| THANOL® TR380[2] | — | — | — | 2.0 | — |
| Dipropylene Glycol | — | — | — | — | 2.0 |
| Water | 2.5 | 2.5 | 2.5 | 2.5 | 2.5 |
| THANCAT DPA | 1.2 | 1.2 | 1.2 | 1.2 | 1.2 |
| Carbon Black Paste | 2.0 | 2.0 | 2.0 | 2.0 | 2.0 |
| A-Component | | | | | |
| MONDUR MR | 50.2 | 49.8 | 49.4 | 48.2 | 50.5 |
| Cup Data | | | | | |
| Rise Time, sec. | 60 | 65 | 63 | 67 | 65 |
| Tack Free, sec. | 165 | 195 | 180 | 210 | 195 |
| Cup Height, inches | 7.0 | 7.3 | 7.3 | 7.2 | 7.5 |

| Formulation, pbw | XI | XII | XIII | XIV | XV |
|---|---|---|---|---|---|
|  | -continued | | | | |
| Cup Weight, grams | 69.5[3] | 68.5[3] | 72.0[3] | 74.0[3] | 68.4[3] |

[1]Carbamate diol crosslinkers. 150 is 2-hydroxyethyl-2-hydroxyethyl carbamate, 165 is 2,hydroxyethyl-2-hydroxypropyl carbamate, 200 is 2-hydroxyethyl-2-(2-hydroxyethoxyethyl) carbamate. U.S. Pat. No. 3,595,814 describes these products. Products of TEXACO CHEMICAL CO.
[2]Difunctional aminopolyol crosslinker which is the reaction product of aniline and about 6 to 7 moles of ethylene oxide. See U.S. Pat. No. 4,067,833. Product of TEXACO CHEMICAL CO.
[3]Note cup weight (foam utilization) compared with Examples 3 and 4; improved usage results from incorporation of these diluent crosslinkers. We still maintain superior reaction profile and cell structure.

EXAMPLES XVI–XXII

The examples demonstrate the use of diluent crosslinkers in semiflexible instrumental panel foam. In these examples lower total crosslinker contents are used which provides softer foam than that described in Examples XI–XV.

| Formulation, pbw | XVI | XVII | XVIII | XIX | XX | XXI | XXII |
|---|---|---|---|---|---|---|---|
| B-Component | | | | | | | |
| THANOL SF-3950 | 100.0 | 100.0 | 100.0 | 100.0 | 100.0 | 100.0 | 100.0 |
| Crosslinker A | 3.6 | 3.6 | 3.6 | 3.0 | 2.4 | 2.5 | 2.0 |
| Dipropylene glycol | 2.4 | — | — | — | — | — | — |
| Propylene glycol | — | 2.4 | 2.4 | 2.0 | 1.6 | 2.5 | 2.0 |
| Water | 2.5 | 2.5 | 2.5 | 2.5 | 2.5 | 2.5 | 2.5 |
| THANCAT® DPA | 1.0 | 1.0 | 1.6 | 1.6 | 1.6 | 1.6 | 1.6 |
| Carbon Black Paste | 2.0 | 2.0 | 2.0 | 2.0 | 2.0 | 2.0 | 2.0 |
| A-Component | | | | | | | |
| MONDUR MR | 48.3 | 51.6 | 51.8 | 49.9 | 48.0 | 51.0 | 48.9 |
| Cup Data | | | | | | | |
| Rise Time, sec. | 92 | 82 | 60 | 63 | 66 | 60 | 64 |
| Tack Free, sec. | 270 | 270 | 165 | 180 | 210 | 180 | 195 |
| Cup Height, in[1] | 7.4 | 7.5 | 7.7 | 7.7 | 7.8 | 7.8 | 7.9 |
| Cup Weight, g.[1] | 68.6 | 66.0 | 63.6 | 63.2 | 63.6 | 61.5 | 62.1 |
| Molding Data | | | | | | | |
| Fill Weight | 307 | 305 | 313 | 307 | 306 | 312 | 308 |
| Part Weight | 301 | 399 | 308 | 300 | 296 | 294 | 308 |

[1]We obtain superior foam utilization when diluent crosslinkers are used, yet we do not sacrifice any of the benefits offered by Crosslinker A when its concentration is reduced.

EXAMPLES XXIII–XXIX

These examples demonstrate influence of higher water levels in the formulations. Higher water levels give lower density foam, better foam usage, less weight per part. Higher water levels in a formulation usually lead to poorer moldability, increased voids, but the use of Crosslinker A allows these higher levels to be used.

| Formulation, pbw | XXIII | XXIV | XXV | XXVI | XXVII | XXVIII | XXIX |
|---|---|---|---|---|---|---|---|
| B-Component | | | | | | | |
| THANOL SF-3950 | 100.0 | 100.0 | 100.0 | 100.0 | 100.0 | 100.0 | 100.0 |
| Crosslinker A | 3.0 | 3.0 | 3.0 | 3.0 | 3.0 | 3.0 | 6.0 |
| Propylene Glycol | 3.0 | 3.0 | 3.0 | 3.0 | 3.0 | 3.0 | — |
| Water | 2.5 | 2.6 | 2.7 | 2.8 | 2.9 | 3.0 | 3.0 |
| THANCAT DPA | 1.2 | 1.2 | 1.2 | 1.2 | 1.2 | 1.2 | 1.2 |
| Carbon Black Paste | 2.0 | 2.0 | 2.0 | 2.0 | 2.0 | 2.0 | 2.0 |
| A-Component | | | | | | | |
| MONDUR MR | 53.1 | 54.4 | 55.3 | 51.1 | 58.8 | 59.8 | 54.3 |
| Cup Data | | | | | | | |
| Rise Time, sec. | 76 | 75 | 74 | 75 | 68 | 65 | 60 |
| Tack Free, sec. | 240 | 240 | 240 | 240 | 240 | 210 | 240 |
| Cup Height, in[1] | 7.7 | 7.9 | 7.9 | 7.9 | 8.0 | 8.3 | 8.1 |
| Cup Weight, g.[1] | 63.7 | 62.3 | 60.9 | 60.1 | 59.9 | 54.8 | 58.1 |
| Molding Data | | | | | | | |
| Mold Fill Wt.[1] | 318 | 322 | 323 | 322 | 324 | 330 | — |
| Mold Part Wt.[1] | 298 | 286 | 284 | 286 | 280 | 263 | — |

[1]Obvious benefits result from higher water levels. (The normal range in commercial formulations is 1.8 to 2.2.) Later examples will show that levels above the standard 2.2 yield good moldability systems.

EXAMPLES XXX–XXXXVI

The examples demonstrate the use of formulations (described in previous examples in laboratory hand mix studies) in machine pours, wherein cups, molds and instrument panel pads are poured. Although cup pours and mold pours are used to indicate moldability, potential reduction of voids, foam usage and higher water utility; machine poured pads fully illustrate these things in actual end use.

| Formulation, pbw | XXX | XXXI | XXXII | XXXIII | XXXIV | XXXV | XXXVI | XXXVII | XXXVIII |
|---|---|---|---|---|---|---|---|---|---|
| B-Component | | | | | | | | | |
| THANOL SF-3950 | 97.5 | 97.5 | 97.5 | 100.0 | 100.0 | 100.0 | 100.0 | 100.0 | 100.0 |
| Polyester Polyol L-1217 | 2.5 | 2.5 | 2.5 | — | — | — | — | — | — |
| NIAX 50-970 | 6.0 | 5.0 | 5.0 | — | — | — | — | — | — |
| Crosslinker A | — | 0.25 | 0.25 | 5.0 | 5.0 | 6.0 | 3.6 | 3.6 | 2.4 |
| Propylene Glycol | — | — | — | — | — | — | 2.4 | 2.4 | 3.6 |
| Water | 2.2 | 2.2 | 2.2 | 2.5 | 2.5 | 2.5 | 2.5 | 2.5 | 2.5 |
| THANCAT DD | 0.35 | 0.35 | 0.35 | — | — | — | — | — | — |
| THANCAT DMDEE | 0.35 | 0.35 | 0.35 | 0.3 | 0.3 | — | — | — | — |
| THANCAT DPA | — | — | — | 0.9 | 0.9 | 0.75 | 1.0 | 1.0 | 1.0 |
| Carbon Black Paste | 2.0 | 2.0 | 2.0 | 2.0 | 2.0 | 2.0 | 2.0 | 2.0 | 2.0 |
| A-Component | | | | | | | | | |
| MONDUR MR | 50.2 | 49.5 | 49.5 | 46.6 | 46.6 | 47.6 | 52.8 | 52.8 | 55.3 |
| Cup Data | | | | | | | | | |
| Rise Time, sec. | 74 | 72 | — | 55 | — | 54 | 55 | — | 54 |
| Tack Free, sec. | 315 | 315 | — | 195 | — | 240 | 240 | — | 240 |
| Height | 6.9 | 7.0 | — | 7.5 | — | 7.0 | 7.6 | — | 7.8 |
| Weight | 75 | 76 | — | 70 | — | 78 | 64 | — | 61 |
| Mold Data | | | | | | | | | |
| Fill Weight | 310 | — | — | — | — | — | — | — | — |
| Part Weight | 305 | — | — | — | — | — | — | — | — |
| Pad Data | | | | | | | | | |
| Voids | two | none | none | one | none | none | none | none | none |
| Weight | 3.00 | 3.04 | 2.88 | 3.10 | 3.10 | 3.00 | 2.66 | 3.14 | 2.66 |
| Machine Condition | | | | | | | | | |
| Shot Time, sec. | 7.8 | 7.8 | 7.8 | 7.8 | 7.8 | 7.8 | 6.0 | 7.8 | 7.0 |
| Temp., °F. | | | | | | | | | |
| B | 81 | 78 | 78 | 86 | 80 | 95 | 93 | 91 | 91 |
| A | 75 | 77 | 77 | 80 | 78 | 80 | 84 | 80 | 80 |
| Mold | 90 | 90 | 90 | 85 | 85 | 85 | 85 | 85 | 90 |

| Formulation, pbw | XXXIX | XXXX | XXXXI | XXXXII | XXXXIII | XXXXIV | XXXXV | XXXXVI |
|---|---|---|---|---|---|---|---|---|
| B-Component | | | | | | | | |
| THANOL SF-3950 | 100.0 | 100.0 | 100.0 | 100.0 | 100.0 | 100.0 | 100.0 | 100.0 |
| Polyester Polyol L-1217 | — | — | — | — | — | — | — | — |
| NIAX 50-970 | — | — | — | — | — | — | — | — |
| Crosslinker A | 2.4 | 3.0 | 3.0 | 3.0 | 2.0 | 2.0 | 2.0 | 2.0 |
| Propylene Glycol | 3.6 | 3.0 | 3.0 | 3.0 | 3.0 | 3.0 | 3.0 | 3.0 |
| Water | 2.5 | 2.5 | 2.5 | 2.5 | 2.5 | 2.5 | 2.5 | 2.5 |
| THANCAT DD | — | — | — | — | — | — | — | — |
| THANCAT DMDEE | — | — | — | — | — | — | — | — |
| THANCAT DPA | 1.0 | 1.0 | 1.0 | 1.0 | 1.0 | 1.0 | 1.0 | 1.0 |
| Carbon Black Paste | 2.0 | 2.0 | 2.0 | 2.0 | 2.0 | 2.0 | 2.0 | 2.0 |
| A-Component | | | | | | | | |
| MONDUR MR | 55.3 | 54.0 | 54.0 | 53.6 | 54.6 | 54.6 | 54.6 | 54.6 |
| Rise Time, sec. | — | 57 | — | 49 | 45 | — | — | — |
| Tack Free, sec. | — | 240 | — | 195 | 255 | — | — | — |
| Height | — | 7.6 | — | 7.9 | 7.8 | — | — | — |
| Weight | — | 65 | — | 62 | 63 | — | — | — |
| Mold Data | | | | | | | | |
| Fill Weight | — | — | — | 311 | — | — | — | — |
| Part Weight | — | — | — | 271 | — | — | — | — |
| Pad Data | | | | | | | | |
| Voids | none | one | none | | none | none | none | none |
| Weight | 2.74 | 2.74 | 2.64 | | 2.78 | 2.56 | 2.66 | 2.76 |
| Machine Conditions | | | | | | | | |
| Shot Time, sec. | 7.0 | 7.0 | 7.2 | | 7.2 | 6.8 | 7.0 | 7.0 |
| Temp., °F., | | | | | | | | |
| B | 91 | 91 | 91 | | 95 | 94 | 94 | 94 |
| A | 80 | 82 | 82 | | 84 | 82 | 82 | 82 |
| Mold | 90 | 80 | 105 | | 90 | 115 | 105 | 95 |

[1] Refers to a laboratory moldability mold. In machine pours where actual instruments panel pads are poured, this data is not always collected. One value is included (Example XXXXII) for comparison with the standard commercial system (Example XXX).
[2] In these machine pours, the material is dispersed from the machine into the mold cavity and molded with a structural insert and vinyl skin. The foam is dispensed throughout the tool by hand, the tool is closed, and in predetermined time, is opened and the part demolded. Foam weight is controlled by the machine shot time.
[3] In these pours, material was not distributed well enough to provide complete fill and the finished pad had a small portion that was not properly filled out.
[4] Pad net weight refers to actual weight of foam in pad.
[5] Note superior foam utilization while maintaining excellent moldability (no voids) compared to standard (Example XXX). A single machine run example is shown here (Example XXX) but from a large number of runs, the voids vary from 1–5 per pad in the defroster area where the void count is made.

I claim:

1. In a method for preparing a molded flexible polyurethane product wherein a polyol, a polyisocyanate, water and a crosslinker are reacted in a closable mold to form the polyurethane product the improvement which comprises using a crosslinker comprising an ethylene oxide adduct of a Mannich condensate prepared from the reaction of nonyl phenol, diethanolamine and formaldehyde.

2. A method as in claim 1 wherein the crosslinker has a hydroxyl number ranging from about 230 to about 500.

3. A method as in claim 1 wherein the crosslinker has a hydroxyl number ranging from about 470 to 480.

4. A method as in claim 1 wherein the polyol is an alkylene oxide adduct of an initiator having both diol and triol components.

5. A method as in claim 3 wherein the polyol is terminated by at least 80% primary hydroxyl groups and has an equivalent weight ranging from about 1600 to 2000.

6. A method as in claim 1 wherein the polyisocyanate is a polymethylene polyphenyl polyisocyanate.

7. A method for preparing a molded flexible polyurethane product comprising reacting in a closable mold a polyol, a polyisocyanate, water and a crosslinker which comprises an ethylene oxide adduct of a Mannich condensate prepared from the reaction of nonyl phenol, diethanolamine and formaldehyde.

8. A method as in claim 6 wherein the crosslinker has a hydroxyl number ranging from about 230 to about 500.

9. A method as in claim 6 wherein the crosslinker has a hydroxyl number ranging from about 470 to 480.

10. A method as in claim 8 wherein the polyol is an alkylene oxide adduct of an initiator having both diol and triol components.

11. A method as in claim 6 wherein the polyol is terminated by at least 80% primary hydroxyl groups and has an equivalent weight ranging from about 1600 to 2000.

12. A method as in claim 1 wherein a low molecular weight diol is also present.

13. A method for preparing a molded flexible polyurethane product comprising reacting in a closable mold a polyol which is alkylene oxide adduct of an initiator having both diol and triol components said polyol having a primary hydroxyl content of at least 80%, a polymethylene polyphenyl polyisocyanate, water and a crosslinker which comprises an ethylene oxide adduct of a Mannich condensate prepared from nonyl phenol, diethanolamine and formaldehyde said crosslinker having a hydroxyl number ranging from about 230 to 500.

14. A method as in claim 13 wherein a low molecular weight diol is also present.

15. A method as in claim 13 wherein a catalyst is present, said catalyst comprising a two mole propylene oxide adduct of dimethylaminopropylamine.

* * * * *